United States Patent
Larson

(10) Patent No.: US 8,208,013 B2
(45) Date of Patent: Jun. 26, 2012

(54) USER-ADJUSTABLE THREE-DIMENSIONAL DISPLAY SYSTEM AND METHOD

(75) Inventor: Brent D. Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 1375 days.

(21) Appl. No.: 11/690,608

(22) Filed: Mar. 23, 2007

(65) Prior Publication Data

US 2008/0231691 A1 Sep. 25, 2008

(51) Int. Cl.
*H04N 13/04* (2006.01)

(52) U.S. Cl. .......................................... 348/56; 348/53

(58) Field of Classification Search ............... 348/14.16, 348/42, 43, 48, 51, 56, E13.003, E13.039, 348/E13.04, E13.026, E13.041, E13.059, 348/E13.067, E13.033, E13.034
See application file for complete search history.

(56) References Cited

U.S. PATENT DOCUMENTS

| | | | |
|---|---|---|---|
| 5,872,590 A * | 2/1999 | Aritake et al. | 348/57 |
| 6,088,006 A * | 7/2000 | Tabata | 345/7 |
| 6,198,484 B1 * | 3/2001 | Kameyama | 345/419 |
| 6,449,309 B1 * | 9/2002 | Tabata | 375/240.01 |
| 6,703,988 B1 | 3/2004 | Fergason | |
| 6,788,274 B2 * | 9/2004 | Kakeya | 345/7 |
| 7,277,121 B2 * | 10/2007 | Mashitani et al. | 348/51 |
| 7,296,901 B2 * | 11/2007 | Togino | 353/122 |
| 2005/0089212 A1 * | 4/2005 | Mashitani et al. | 382/154 |
| 2005/0190443 A1 * | 9/2005 | Nam et al. | 359/464 |
| 2006/0209183 A1 * | 9/2006 | Mashitani et al. | 348/51 |

* cited by examiner

*Primary Examiner* — Lashonda Jacobs
(74) *Attorney, Agent, or Firm* — Ingrassia Fisher & Lorenz, P.C.

(57) ABSTRACT

A display system and method for providing user adjustability of displayed three-dimensional images. The system simultaneously displays a left-eye perspective view of an image and a right-eye perspective view of the same image, at a separation distance, and allows for the selective control of the separation distance via, for example, a user interface. The system and method allows multiple users to use multiple pieces of display hardware and quickly return each piece of display hardware to a user's own individualized preferences and compatibilities. It additionally allows a user to vary the display properties, such as providing extra foreshortening or stretching along the depth axis, quickly and simply.

6 Claims, 1 Drawing Sheet

USER-ADJUSTABLE THREE-DIMENSIONAL DISPLAY SYSTEM AND METHOD

TECHNICAL FIELD

The present invention generally relates to three-dimensional image displays, and more particularly a system and method of providing user adjustability of displayed three-dimensional images.

BACKGROUND

Three-dimensional (3D) displays are becoming increasingly popular. Presently, many 3D displays implement stereoscopic techniques to generate a 3D visual display to a user. Such displays, which may be referred to as stereoscopic 3D displays, rely on the well-known stereoscopic imaging technique for creating the illusion of depth in an image. As is generally known, stereoscopy is a method of creating a 3D image from a pair of two-dimensional (2-D) images, in which each of the 2-D images preferably represents the same object or image from a slightly different perspective, such as a right-eye perspective and a left-eye perspective.

When a stereoscopic 3D image is generated by 3D displays, such as the ones generally described above, the details of the perceived depth presentation, and to some extent the comfort level and usability of the depth presentation, may depend upon numerous parameters. For example, the apparent foreshortening, or conversely stretching, of a stereoscopic 3D image along the depth axis may result from a mismatch between stereo camera vergence angles to an object, and from the visual binocular vergence angle to the image of that object. In many stereoscopic display applications, such as a remote telepresence application, or various other precision applications, establishing an operator familiarity for the depth and perception can lead to increased operator proficiency. However, because each operator is typically different, and various platforms may be involved, a 3D display configured for optimal comfort, usability, and proficiency for one user on one platform, may not be optimally comfortable, usable, or proficient for another user on the same or different platform.

Various methods and devices have been developed to address the above-noted drawback of 3D displays. For example, various mechanical and other types of subjective adjustments have been used. Although these adjustments allow a user to subjectively adjust a display such that the displayed image looks good to the user, such adjustments can be unrepeatable and time-consuming, thereby making them inappropriate for many tasks. One-size-fits-all approaches can be even more problematic, leading to potential misinterpretation of depth information or even fatigue and discomfort. The disclosed invention provides for a robust and consistent stereoscopic presentation.

Hence, there is a need for a system and method that enhances the usability and standardization of stereoscopic 3D displays for multiple users across multiple platforms. The present invention addresses at least this need.

BRIEF SUMMARY

In one embodiment, and by way of example only, a stereoscopic display system includes a left-eye perspective image data source, a right-eye perspective image data source, a stereoscopic display, and a parallax controller. The left-eye perspective image data source is configured to supply left-eye image data representative of an image including an object from a left-eye perspective. The right-eye perspective image data source is configured to supply right-eye image data representative of the image including the object from a right-eye perspective. The stereoscopic display is configured to simultaneously display, at a separation distance, the image of the object from the left-eye perspective and the image of the object from the right-eye perspective, whereby a user may view a three-dimensional (3D) representation of the image. The parallax controller is coupled to receive the left-eye image data, the right-eye image data, and an input control signal. The parallax controller is configured, in response to the input control signal, to determine the separation distance, and to command the stereoscopic display to simultaneously display the image from the left-eye perspective and the image from the right-eye perspective, separated by the separation distance.

In another exemplary embodiment, a method of controlling the stereoscopic display of an image including an object comprises simultaneously displaying, at a separation distance, a left-eye perspective view of the image of the object and a right-eye perspective view of the image of the object, and selectively controlling the separation distance.

Other independent features and advantages of the preferred display system and method will become apparent from the following detailed description, taken in conjunction with the accompanying drawings which illustrate, by way of example, the principles of the invention.

BRIEF DESCRIPTION OF THE DRAWINGS

Embodiments of the present invention will hereinafter be described in conjunction with the following drawing figures, wherein like numerals denote like elements, and wherein.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
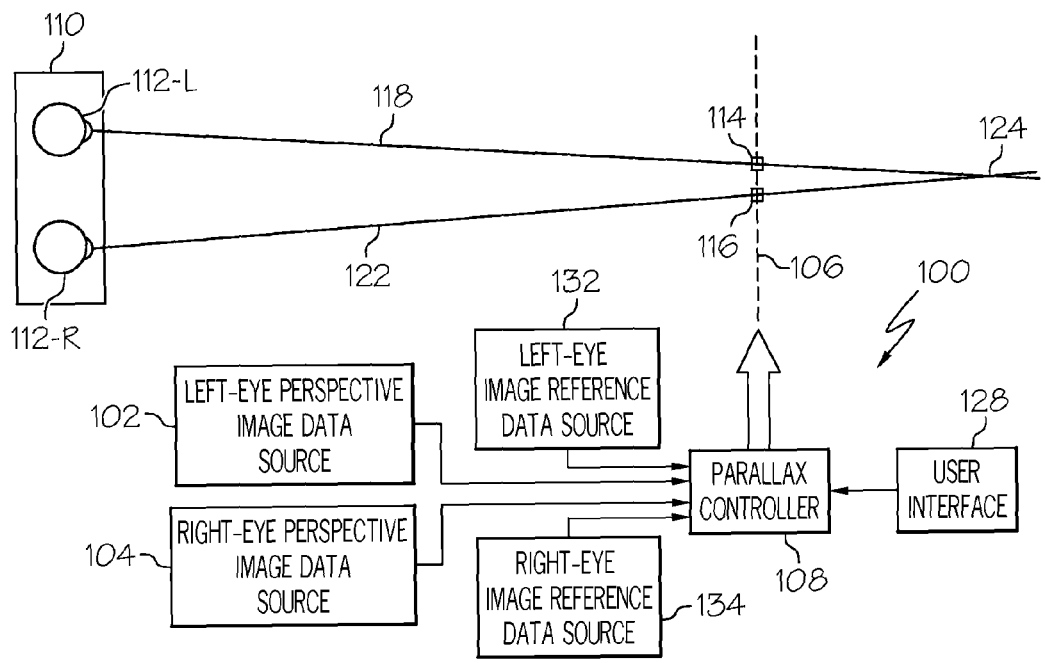
FIG. 1 depicts a functional block diagram of an embodiment of a 3D display system 100.

Turning now to FIG. 1, a functional block diagram of a particular embodiment of a 3D display system 100 is depicted, and includes a left-eye perspective image data source 102, a right-eye perspective image data source 104, a stereoscopic display 106, and a parallax controller 108. The left-eye perspective image data source 102 supplies left-eye image data representative of an image from a left-eye perspective, and the right-eye perspective image data source 104 supplies right-eye image data representative of the image from a right-eye perspective. It will be appreciated that the left-eye and right-eye perspective image data sources 102, 104 may be implemented using any one of numerous suitable devices including, for example, one or more cameras or other video sources, memory, tape players, CD-ROM devices, processors, or devices adapted to receive signals from one or more remote devices. In one particular embodiment in which the image data sources 102, 104 are implemented as a pair of cameras, the cameras preferably are mechanically aligned to supply fixed and equal left-eye and right-eye perspective image data. In addition, the cameras are preferably identical and are preferably aimed in parallel to supply equal left-eye and right-eye perspective image data.

The stereoscopic display 106 is configured to generate a 3D representation of image of an image viewable by a viewer 110. The stereoscopic display 106 may be implemented using any one of numerous suitable stereoscopic display devices now known or developed in the future. In the depicted embodiment the stereoscopic display 106 is implemented using coplanar display media. It will be appreciated, however, that the stereoscopic display 106 could also be implemented using non-coplanar stereo display media, such as the display media disclosed in U.S. Pat. No. 6,703,988. No matter the particular display media that are used, the stereoscopic display 106 simultaneously displays an image from the left-eye perspective and an image from the right-eye perspective that are supplied from the left-eye perspective image data source 102 and the right-eye perspective image data source 104, respectively.

The viewer 110 that is viewing the stereoscopic display 106 is typically a binocular viewer 110, having two eyes 112-L, 112-R or the equivalent thereof that are separated by an interpupillary distance (IPD). As FIG. 1 additionally depicts, when the left-eye perspective image and the right eye perspective image are simultaneously displayed, two images 114, 116 of the same object are displayed to the viewer 110. One of the images 114 is a left-eye perspective image of the object, and is visible to the viewer's left eye 112-L only, via a left-eye line-of-sight 118. The other image 116 is a right-eye perspective image of the object, and is visible to the viewer's right eye 112-R only, via a right-eye line-of-sight 122. As is generally known, the intersection of the left-eye and right-eye lines of sight 118, 112 is used to represent the perceived location 124 of the object. In the depicted embodiment, the perceived location 124 is behind the stereoscopic display at non-infinite location. It will be appreciated, however, that the intersection 124 can be at an infinite location behind the stereoscopic display 106, or in front of, or even in the plane of, the stereoscopic display 106.

Figure 2:
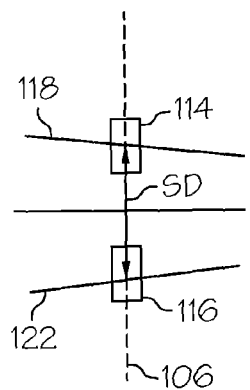
FIG. 2 depicts an enlarged view of a portion of the system depicted in FIG. 1.

Turning briefly to FIG. 2, which is an enlarged view of a portion of the display system 100, it is seen that when the stereoscopic display 106 simultaneously displays the left-eye perspective image 114 and the right eye perspective image 116 of the same object, the images 114, 116 are simultaneously displayed at a separation distance (SD). It is noted that when non-coplanar stereo display media are used to implement the stereoscopic display 106, a comparable separation distance, having a more complex form but an equivalent significance, is defined. In any case, it is noted that the display system 100 depicted in FIG. 1 provides the capability to control the separation distance, and indeed set or calibrate the separation distance for an individual viewer's own individualized preferences and compatibilities. This capability is provided via the parallax controller 108, an embodiment of which will now be described.

Returning once again to FIG. 1, it is seen that the parallax controller 108 is coupled to the left-eye perspective image data source 102, the right-eye perspective image data source 104, and the stereoscopic display 106. The parallax controller 108 receives left-eye image data from the left-eye perspective image data source 102, and right-eye image data from the right-eye perspective image data source 104. The parallax controller 108 is additionally coupled to receive an input control signal from, for example, a user interface 128. The parallax controller 108 is configured, in response to the input control signal, to determine the separation distance, and to command the stereoscopic display 106 to simultaneously display the left-eye perspective image 114 and the right eye perspective image 116 of the same object, separated by the separation distance.

The parallax controller 108 thus provides calibrated control of the separation distance based, at least in part, on the input signal supplied from the user interface 128. Preferably, the user interface 128 allows for the selection of one of a number of discrete input values or settings, which are mapped by the parallax controller to a particular separation distance. It will be appreciated that the user interface 128 may be variously configured, and may be implemented using any one of numerous known user interface devices that are responsive to user input stimuli. For example, the user interface 128 may be implemented using a detent enabled switch having a discrete number of positions. Alternatively, the user interface 128 may be implemented using a set of pushbutton switches, a digital value input switch, an analog knob having a resulting digital output, or a knob with a discrete number of fiducial markings. It will additionally be appreciated that the user interface 128 may be labeled using various types of suitable indicia. For example, the indicia may represent tenths of inches of separation distance, such as separation distance for an infinitely distant object; however, various other linear, non-linear, or non-numeric indicia may be used. In addition, the user interface 128 may be disposed on, or remotely from, the parallax controller 108.

As FIG. 1 additionally depicts, the display system 100 preferably includes two additional data sources, both of which are in operable communication with the parallax controller 108. These additional data sources include a left-eye image reference data source 132 and a right-eye image reference data source 134. The left-eye and right-eye image reference data sources 132, 134 supply left-eye image reference data and right-eye image reference data, respectively, to the parallax controller 108. These reference data are representative of one or more reference features in the 3D image, and alert the parallax controller 108 of any offset shifting that may need to be done in addition to that which is based on the input signal. It will be appreciated that the reference features may represent either actual features that appear in the 3D image or "virtual features" that do not actually appear in the 3D image. An example of a virtual feature may be where an infinite object would appear in the image if the infinite object were displayed. It will additionally be appreciated that the left-eye and right-eye image reference data preferably identify the position in each image of a single infinitely distant object that is located, or would be located, approximately in the center of the combined field of view; however, other distant objects could alternatively be used. In addition, when the image data sources 102, 104 are implemented as a pair of cameras, as discussed above, the left-eye image reference data and the right-eye image reference data may each be fixed values, and the first and second cameras are mechanically aligned to match the fixed values.

As with other components of the display system 100, the left-eye and right-eye image reference data sources 132, 134 may be implemented using any one of numerous devices, and may additionally be configured to supply the left-eye image reference data and right-eye image reference data, respectively, using various techniques. For example, the left-eye and right-eye image reference data sources 132, 134 may be implemented using digital image or symbol generators, which could be configured to supply the left-eye and right-eye image reference data along with the overall image data. In still other embodiments, the left-eye and right-eye image reference data sources 132, 134 may be implemented as memory storage devices. In such embodiments, the parallax controller 108 may be configured to selectively retrieve the left-eye and right-eye image reference data from the memory storage devices. In yet other embodiments, the image reference data sources 132, 134 could be configured to determine the left-eye and right-eye image reference data by analyzing the left-eye and right-eye perspective image data. Moreover, the image reference data sources 132, 134 may be optionally contained within the parallax controller 108.

In addition to the above, it will be appreciated that various image reference data contributions may be accounted for such as, for example, camera alignment, and display offsets, just to name a few. It will additionally be appreciated that multiple image components may be combined, each having its own image reference data. An example of this latter case would be to adjust the image reference values for symbology, to keep it at or near the effective focus plane of the stereoscopic display 106, while allowing the parallax controller 108 to alter the vergence range and depth scaling of an overlaid 3D scene.

The display system 100 described herein allows multiple users to use multiple pieces of display hardware and quickly return each piece of display hardware to a user's own individualized preferences and compatibilities. It additionally allows a user to vary the display properties, such as providing extra foreshortening or stretching along the depth axis, quickly and simply.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A stereoscopic display system, comprising:
   a first left-eye perspective image data source configured to supply first left-eye image data representative of an image of an object from a left-eye perspective;
   a first right-eye perspective image data source configured to supply first right-eye image data representative of the image of the object from a right-eye perspective;
   a second left-eye perspective image data source configured to supply second left-eye image data representative of an image of symbology from the left-eye perspective;
   a second right-eye perspective image data sources configured to supply second right-eye image data representative of the image of the symbology from the right-eye perspective;
   a stereoscopic display having an effective focus plane and configured to simultaneously display, at a separation distance, the image of the object from the left-eye perspective and the image of the object from the right-eye perspective, and to further simultaneously display, at a second separation distance, the image of the symbology from the left-eye perspective and the image of the symbology from the right-eye perspective, whereby a user may simultaneously view a three-dimensional (3D) representation of the image of the object and the image of the symbology;
   a left-eye image reference data source operable to supply left-eye image reference data representative of one or more reference features in the image of the object and in the image of the symbology;
   a right-eye image reference data source operable to supply right-eye image reference data representative of the one or more reference features in the image of the object and in the image of the symbology; and
   a parallax controller coupled to receive the left-eye image data, the right-eye image data, the left-eye image reference data, the right-eye image reference data, and a user-adjustable input control signal, the parallax controller configured, in response to the left-eye image reference data, the right-eye image reference data, and the user-adjustable input control signal to determine the first and the second separation distances, and further configured to command the stereoscopic display to simultaneously display (i) the image of the object from the left-eye perspective and the image of the object from the right-eye perspective, separated by the first separation distance and (ii) the image of the symbology from the left-eye perspective and the image of the symbology from the right-eye perspective, separated by the second separation distance.

2. The system of claim 1, wherein the left-eye image reference data and right-eye image reference data are each representative of a position in the left-eye perspective image data and a position in the right-eye perspective image, respectively, of an object in the 3D representation of the image.

3. The system of claim 2, wherein the object is a distant object located at least proximate a center of the 3D representation of the image.

4. The system of claim 1, further comprising:
   a user interface in operable communication with, and responsive to input stimuli to supply the user-adjustable input control signal to, the parallax controller.

5. A method of controlling stereoscopic display of first and second images, the method comprising the steps of:
   simultaneously displaying, at a first separation distance, a left-eye perspective view of the first image and a right-eye perspective view of the first image;
   simultaneously displaying, at a second separation distance, an additional left-eye perspective view of the second image and an additional right-eye perspective view of the second image, the second image comprising symbology;
   selectively controlling the first separation distance and the second separation distance in response to a user-adjustable input;
   determining the first and second separation distances from left-eye image reference data and right-eye image reference data, the left-eye image reference data and the right-eye image reference data each representative of one or more reference features in the first and second images and each representative of a position in the left-eye perspective image data and a position in the right-eye perspective image data, respectively, of an object in the 3D representation of the image,
   wherein the object is a distant object located at least proximate a center of the 3D representation of the image.

6. The method of claim 5, further comprising:
   deriving the left-eye image reference data and the right-eye image reference data from the left-eye perspective image data and the right-eye perspective image data, respectively.

* * * * *